Figure 4:
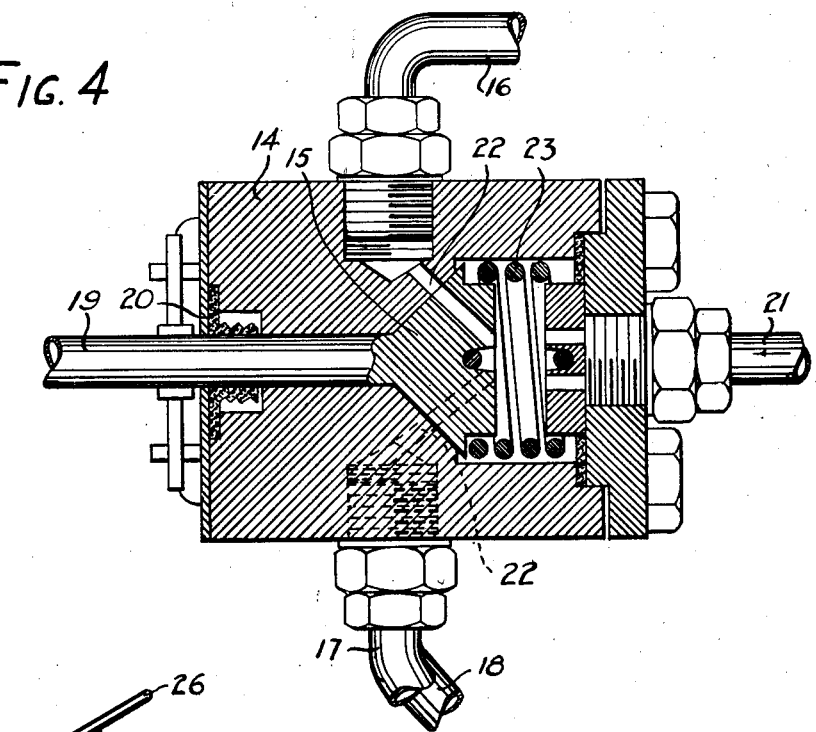

April 12, 1949.                G. E. BOHR                   2,466,837
                INDIVIDUAL BRAKE CONTROL FOR HYDRAULIC BRAKES
Filed Aug. 26, 1946                                       2 Sheets-Sheet 1
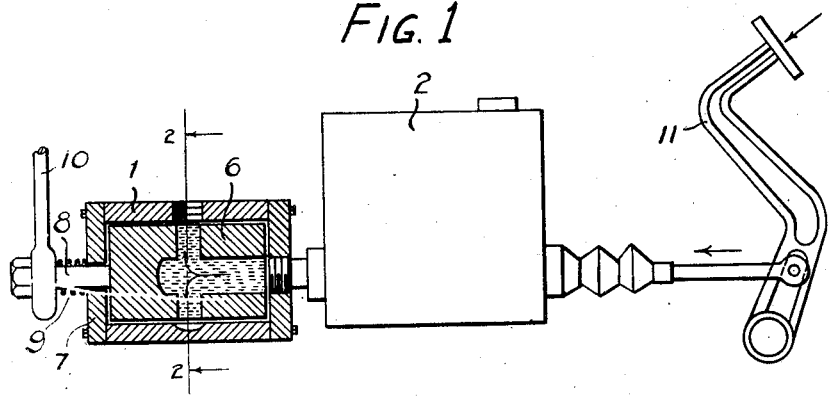
FIG. 1
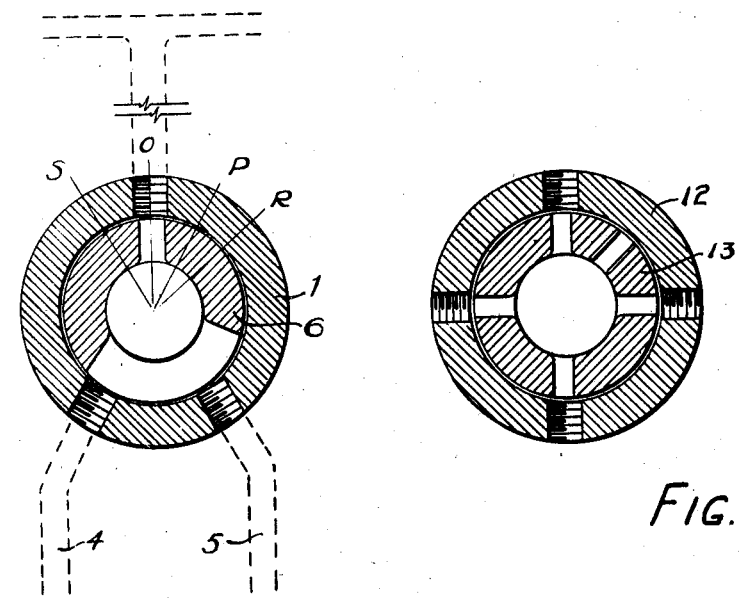
FIG. 2
FIG. 3
INVENTOR:
Gustaf Einar Bohr,
BY:
Pierce, Scheffler & Parker,
Attorneys.

April 12, 1949.  G. E. BOHR  2,466,837
INDIVIDUAL BRAKE CONTROL FOR HYDRAULIC BRAKES
Filed Aug. 26, 1946  2 Sheets-Sheet 2

INVENTOR.
Gustaf Einar Bohr,
BY:
Pierce, Scheffler & Parker,
Attorneys.

Patented Apr. 12, 1949

2,466,837

UNITED STATES PATENT OFFICE 2,466,837

INDIVIDUAL BRAKE CONTROL FOR HYDRAULIC BRAKES

Gustaf Einar Bohr, Stockholm, Sweden

Application August 26, 1946, Serial No. 693,070
In Sweden July 4, 1945

Section 1, Public Law 690, August 8, 1946
Patent expires July 4, 1965

4 Claims. (Cl. 188—152)

This invention relates to a distributing and cut-off valve for the braking systems of motor cars.

If one of the driving wheels on a driving axle of a motor car provided with a differential gearing happens to slip, that is to say to "spin" on the road, which is caused by the fact that the frictional resistance of the road against this wheel is less than the driving power at the periphery of the wheel, a tractive power may be obtained on the other driving wheel, if the spinning wheel is braked individually without the remaining wheel brakes of the vehicle being actuated at the same time.

For motor vehicles, the brake system of which operates with a fluid under pressure and includes conduits for the transfer of the fluid to the wheel brakes, particularly hydraulic brakes, the existing brake system may be utilized for this purpose with the aid of a distributing and cut-off valve connected to the brake master cylinder, from which valve the wheel brake conduits extend and through which under the said operating conditions all wheel brakes excepting that of the spinning wheel are cut off from the braking fluid, by reason of which the latter wheel may be braked individually by depression of the brake pedal.

From the point of view of safety in traffic, however, it is indispensable in this connection that the valve return automatically into the normal position upon braking of a spinning wheel as described, all of the wheel brake conduits being then left fully open for ordinary braking of the vehicle, inasmuch as any neglect in returning the cut-off means of the valve into said normal position might involve severe accidents at subsequent braking in travel. Furthermore, since under such operating conditions, which are frequently strenuous enough to the driver, the clutch, steering and gas controlling means call for the whole of his attention, it is of the utmost importance that the valve is automatically retained in the adjusted cut-off position while braking is being effected, and is then instantly returned to the normal position after the braking has ceased.

The high braking pressures in the valve during braking place great demands on the sealing effect of the valve both outwardly and inwardly between the various outlets in the valve seat.

The present invention has for its object to provide means by which all of the above requirements are answered.

I attain this object by mechanism illustrated in the accompanying drawings in which—

Figure 5:
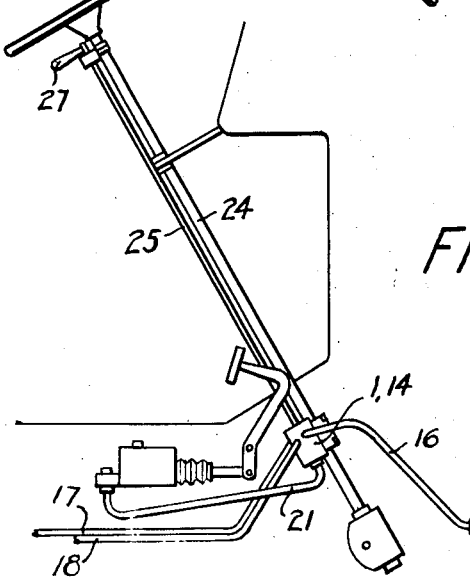

Fig. 1 shows a distributing and cut-off valve devised in accordance with the invention and some parts connected thereto. Fig. 2 is a section to a larger scale on line II—II in Fig. 1. Fig. 3 shows a similar section through another embodiment. Fig. 4 is a sectional view of a distributing and cut-off valve formed in a different manner, and Fig. 5 shows the disposition of the valve in a motor car.

The distributing and cut-off valve shown in Figs. 1 and 2 is arranged in a valve housing 1, which is connected to or built integral with the master cylinder 2 of an ordinary motor car brake system for a two-axle, rear-wheel-driven car with brakes on all of the four wheels. Extending from the valve housing 1 is, first, a brake conduit 3 to the front axle, said conduit being branched at this axle in the ordinary manner to the two front wheel brakes, and, second, conduits 4 and 5, respectively to each one of the two rear wheel brakes. The cut-off member is constituted, according to the exemplified construction, by a slide valve 6, which is rotatably arranged in the valve housing and adapted at braking to be pressed by the pressure fluid coming from the master cylinder 2 against the wall 7 of the valve housing having the valve stem 8 extending therethrough. The cut-off member 6 is provided with through-apertures for the braking fluid, said apertures extending from the bottom of the valve facing the inlet to the periphery. The braking pressure is utilized to seal off the stem outwardly, and the friction produced by the pressure between the cut-off member 6 and the valve housing 1 is utilized to retain the cut-off member in closed position against the action of a combined torsional and compression spring 9 arranged about the stem 8 for the returning of the latter.

In the valve position O, the normal position as shown in Fig. 2, all of the wheel brake conduits 3, 4, 5 are entirely open. If the valve is turned against the action of the returning spring by means of the arm 10 into the position designated by R, the braking fluid will only be permitted to pass through the braking conduit 4 to the one rear axle wheel, and when the valve is adjusted to the position S, said fluid is only permitted to pass to the other rear axle wheel through the conduit 5. In the position P, both of the front wheel brakes will be cut off from the braking fluid, for instance if it is desired on a slippery road to prevent the steering wheels from locking themselves at the braking of the car.

As soon as the cut-off member 6 has been adjusted into a certain position and the braking pedal 11 has been depressed, the cut-off member will be retained in this position under the influence of the pressure of the braking fluid. When the braking pedal is then released, the pressure on the cut-off member is caused to cease, this member being thus immediately returned by the spring 9 into the normal position shown in Fig. 2, in which all of the braking conduits are open.

Fig. 3 shows a distributing and cut-off valve adapted for vehicles driven by all of their four wheels. Here, the valve housing 12 is provided with four through-apertures and the cut-off member 13 with five radial bores. In the normal position shown, all of the wheel brake conduits are open. As will clearly appear from the drawing, the cut-off member 13 may be adjusted so that only one of the four wheel brake conduits is brought into communication with the master cylinder 2, whereas the other conduits are cut off therefrom.

According to Fig. 4, the cut-off member 15 provided in the valve housing 14 is shaped as a frustrated cone axially disposed in the direction of the pressure of the braking fluid and having a comparatively large conical mantle surface, which is rotatable in a conical seat in the valve housing whence the wheel brake conduits 16, 17 and 18 extend. The cut-off member 15 is connected to a valve stem 19 extending from the smaller base surface of the cone and coinciding with the extension of the axis of the cone, said valve stem 19 being taken through a packing 20. The braking fluid enters from the master cylinder through the conduit 21. Passages 22 for the braking fluid extend from the larger base surface of the cone facing the inlet side of the valve housing to the conical mantle surface in the valve seat. The cut-off member 15 is normally pressed against the seat by means of a spring 23 of a moderate effect, but at braking it will be forcibly pressed by the fluid pressure against the valve seat, which aids toward an adequate sealing effect at the prevailing great pressures in the system, and whereby the cut-off member 15 will be safely retained in its position of adjustment, until the braking effect ceases. Only then will be valve member 15 be returned into its normal position under the influence of the combined compression and torsional spring 23. Normally, this spring keeps the cut-off member pressed at a moderate pressure against the valve seat, and counteracts a turning movement in both directions from the normal position. Otherwise, the mode of operation is the same as in the previously described embodiments.

The operating means of the valve take a simple form, if the valve be arranged according to Fig. 5 at the bottom of the steering column 24 of the motor car with the valve stem directed upwardly and formed into or connected to an operating rod 25 extending upwardly along the steering column, said operating rod being terminated at the top by an operating handle 27 underneath the steering wheel 26.

What I claim is:

1. In a fluid pressure braking system for motor vehicles, a brake master cylinder, means for actuating said master cylinder, a control valve including a valve casing and a valve member and having a fluid inlet and separate fluid outlets, said fluid inlet communicating with said master cylinder, a number of separate braking fluid conduits connected to said outlets, means for adjusting said valve member in different positions, said valve member being constructed and arranged in one position to permit flow of braking fluid from said inlet to all of said outlets and in another position to cut off the communication between said inlet and at least one of said outlets and to be retained in the last-named position during braking by the pressure of the braking fluid, and resilient means for returning said valve member into said first-named position when the pressure of the braking fluid ceases.

2. In a fluid pressure braking system for motor vehicles, a brake master cylinder, means for actuating said master cylinder, a control valve including a valve casing and a valve member and having a fluid inlet and separate fluid outlets, said valve member being turnable in said valve casing about an axis substantially coinciding with the axis of said fluid inlet, said fluid inlet communicating with said master cylinder, a number of separate braking fluid conduits connected to said outlets, means for adjusting said valve member in different positions, said valve member being constructed and arranged in one position to permit flow of braking fluid from said inlet to all of said outlets and in another position to cut off the communication between said inlet and at least one of said outlets and to be retained in the last-named position during braking by the pressure of the braking fluid, and resilient means for returning said valve member into said first-named position when the pressure of the braking fluid ceases.

3. In a fluid pressure braking system for motor vehicles, a brake master cylinder, means for actuating said master cylinder, a control valve including a valve casing and a valve member and having a fluid inlet and separate fluid outlets, said fluid inlet communicating with said master cylinder, a number of separate braking fluid conduits connected to said outlets, means for adjusting said valve member in different positions, said valve member being constructed and arranged in one position to permit flow of braking fluid from said inlet to all of said outlets and in another position to cut off the communication between said inlet and at least one of said outlets and to be retained in the last-named position during braking by the pressure of the braking fluid, and resilient means for returning said valve member into said first-named position when the pressure of the braking fluid ceases, said resilient means being constituted by a combined torsional and compression spring arranged to maintain said valve member in said first-named position during non-braking.

4. In a fluid pressure braking system for motor vehicles, a brake master cylinder, means for actuating said master cylinder, a control valve including a valve casing having a conical valve seat and a valve member in the shape of a frustrated cone adapted to be turned about its axis in said valve seat, said valve casing having a fluid inlet and separate fluid outlets, said inlet communicating with said master cylinder, a number of separate braking fluid conduits connected to said outlets, said conical valve member having passages extending from the larger base surface facing said inlet outwardly to the conical mantle surface communicating with said outlets, an operating stem extending from the center of the smaller base surface of the valve member in the direction of the axis thereof for adjusting said valve member in different positions, said valve member being constructed and arranged in one position to permit flow of braking fluid from said inlet to all of said outlets and in another position to cut off the communication between said inlet and at least one of said outlets and to be retained in the last-named position during braking by the pressure of the braking fluid, and resilient means for returning said valve member into said first-named position when the pressure of the braking fluid ceases.

GUSTAF EINAR BOHR.

REFERENCES CITED

The following references are of record in the file of this patent:

UNITED STATES PATENTS

| Number | Name | Date |
| --- | --- | --- |
| 1,918,465 | Gardner | July 18, 1933 |
| 2,155,701 | Erickson | Apr. 25, 1939 |
| 2,233,192 | Armington | Feb. 25, 1941 |
| 2,287,969 | Brown | June 30, 1942 |